US012688427B2

(12) United States Patent  
Guez et al.

(10) Patent No.: US 12,688,427 B2  
(45) Date of Patent: Jul. 21, 2026

(54) TRAINING ACTION SELECTION NEURAL NETWORKS USING HINDSIGHT MODELLING

(71) Applicant: GDM Holding LLC, Mountain View, CA (US)

(72) Inventors: Arthur Clement Guez, London (GB); Fabio Viola, Montréal (CA); Theophane Guillaume Weber, London (GB); Lars Buesing, Letchworth Garden City (GB); Nicolas Manfred Otto Heess, London (GB)

(73) Assignee: GDM Holding LLC, Mountain View, CA (US)

( * ) Notice: Subject to any disclaimer, the term of this patent is extended or adjusted under 35 U.S.C. 154(b) by 1110 days.

(21) Appl. No.: 17/763,901

(22) PCT Filed: Sep. 23, 2020

(86) PCT No.: PCT/EP2020/076604  
§ 371 (c)(1),  
(2) Date: Mar. 25, 2022

(87) PCT Pub. No.: WO2021/058588  
PCT Pub. Date: Apr. 1, 2021

(65) Prior Publication Data  
US 2022/0366245 A1　　Nov. 17, 2022

Related U.S. Application Data

(60) Provisional application No. 62/905,915, filed on Sep. 25, 2019.

(51) Int. Cl.  
*G06N 3/084*　　(2023.01)  
*G06N 3/08*　　(2023.01)  
*G06V 10/82*　　(2022.01)

(52) U.S. Cl.  
CPC ............... *G06N 3/084* (2013.01); *G06N 3/08* (2013.01); *G06V 10/82* (2022.01)

(58) Field of Classification Search  
CPC ......... G06N 3/084; G06N 3/08; G06F 18/295  
See application file for complete search history.

(56) References Cited

U.S. PATENT DOCUMENTS

| | | | | |
|---|---|---|---|---|
| 8,447,706 B2 * | 5/2013 | Schneegaß | ........... | G05B 13/027 |
| 2001/0044719 A1 * | 11/2001 | Casey | ................... | G10L 21/028 |

(Continued)

FOREIGN PATENT DOCUMENTS

| | | |
|---|---|---|
| CN | 105637540 A | 6/2016 |
| CN | 108885717 A | 11/2018 |

(Continued)

OTHER PUBLICATIONS

Fang, et al. "Curriculum-guided hindsight experience replay" (Year: 2019).*

(Continued)

*Primary Examiner* — Michelle T Bechtold  
*Assistant Examiner* — Matiyas T Maru  
(74) *Attorney, Agent, or Firm* — Fish & Richardson P.C.

(57) ABSTRACT

A reinforcement learning method and system that selects actions to be performed by a reinforcement learning agent interacting with an environment. A causal model is implemented by a hindsight model neural network and trained using hindsight i.e. using future environment state trajectories. As the method and system does not have access to this future information when selecting an action, the hindsight model neural network is used to train a model neural network which is conditioned on data from current observations, which learns to predict an output of the hindsight model neural network.

20 Claims, 5 Drawing Sheets

(56) References Cited

U.S. PATENT DOCUMENTS

| | | | | |
|---|---|---|---|---|
| 2020/0241878 A1* | 7/2020 | Chandak | | G06F 9/3818 |
| 2021/0073563 A1* | 3/2021 | Karianakis | | G06V 20/41 |

FOREIGN PATENT DOCUMENTS

| | | |
|---|---|---|
| CN | 110023965 A | 7/2019 |
| CN | 110088774 A | 8/2019 |
| CN | 110114783 A | 8/2019 |
| CN | 110235148 A | 9/2019 |
| WO | WO 2018224471 A1 | 12/2018 |
| WO | WO 2021058588 A1 | 4/2021 |

OTHER PUBLICATIONS

Garcia, et al., "A comprehensive survey on safe reinforcement learning." (Year: 2015).*

Oh, et al., "Value prediction network." (Year: 2017).*

Fang, et al. "DHER: Hindsight experience replay for dynamic goals" (Year: 2018).*

Lillicrap, et al. "Continuous control with deep reinforcement learning." (Year: 2015).*

Shao, et al., "Starcraft micromanagement with reinforcement learning and curriculum transfer learning." (Year: 2018).*

Rauber, Paulo, et al. "Hindsight policy gradients." (Year: 2017).*

Eysenbach, Benjamin, et al. Diversity is all you need: Learning skills without a reward function. (Year: 2018).*

Fang, et al. "Curriculum-guided hindsight experience replay", (Publication date: Sep. 6, 2019) (Year: 2019).*

Zhao et al., "Curiosity-driven experience prioritization via density estimation." (Year: 2019).*

Andrychowicz et al., "Hindsight Experience Replay", Arxiv.org, Jul. 2017.

Bellemare et al., "The arcade learning environment: An evaluation platform for general agents," Journal of Artificial Intelligence Research, 47:253-279, Jun. 2013.

Buesing et al., "Woulda, coulda, shoulda: Counterfactually-guided policy search," arXiv preprint arXiv:1811.06272, 2018.

Decision to Grant a Patent in Japanese Appln. No. 2022-519019, dated Jul. 18, 2023, 5 pages (with English translation).

Espholt et al., "Impala: Scalable distributed deep-RL with importance weighted actor-learner architectures," 35th International Conference on Machine Learning, 1407-1416, Jul. 2018.

Farahmand, "Iterative value-aware model learning," Advances in Neural Information Processing Systems, 9072-9083, Dec. 2018.

Gelada et al., "Deep MDP: Learning continuous latent space models for representation learning," 36th International Conference on Machine Learning, 2170-2179, May 2019.

Guez et al., "An investigation of model-free planning," 36th International Conference on Machine Learning, 2464-2473, May 2019.

Haarnoja et al., "Soft actor-critic: Off policy maximum entropy deep reinforcement learning with a stochastic actor," 35th International Conference on Machine Learning, 1861-1870, Jul. 2018.

Harutyunyan et al., "Hindsight credit assignment," Advances in Neural Information Processing Systems 32, 12488-12497, Dec. 2019.

Hasselt et al., "Deep reinforcement learning with double Q-learning," 30th AAAI Conference on Artificial Intelligence, Feb. 2016.

International Search Report and Written Opinion in International Appln. No. PCT/EP2020/076604, mailed on Sep. 12, 2020, 10 pages.

Jaderberg et al., "Reinforcement learning with unsupervised auxiliary tasks," 5th International Conference on Learning Representations, Nov. 2016.

Kapturowski et al., "Recurrent experience replay in distributed reinforcement learning," 7th International Conference on Learning Representations, May 2019.

Lillicrap et al., "Continuous control with deep reinforcement learning," 4th International Conference on Learning Representations, ICLR, 2016.

Mnih et al., "Asynchronous Methods for Deep Reinforcement Learning," International Conference on Machine Learning, Jun. 2016, 1928-1937.

Mnih et al., "Human-level control through deep reinforcement learning," Nature, 518(7540):529-33, Feb. 2015.

Oh et al., "Value prediction network," Advances in Neural Information Processing Systems 30, 6118-6128, 2017.

Pinto et al., "Asymmetric actor critic for image-based robot learning," Robotics: Science and Systems (RSS), 2018.

Racanière et al., "Imagination-augmented agents for deep reinforcement learning," Advances in neural information processing systems, 5690-5701, 2017.

Schrittwieser et al., "Mastering Atari, Go, Chess and Shogi by planning with a learned model," arXiv preprint arXiv:1911.08265, 2019.

Schulman et al., Proximal policy optimization algorithms, arXiv preprint arXiv:1707.06347, 2017.

Silver et al., "The predictron: End-to end learning and planning," International Conference on Machine Learning, 3191-3199, 2017.

Sutton et al., "Horde: A scalable real-time architecture for learning knowledge from unsupervised sensorimotor interaction," 10th International Conference on Autonomous Agents and Multiagent Systems—vol. (2) 761-768, 2011.

"Reinforcement learning: An introduction," 2nd ed., MIT Press, Nov. 2018.

Talvitie, "Model regularization for stable sample rollouts," Proceedings of the Thirtieth Conference on Uncertainty in Artificial Intelligence, 780-789. AUAI Press, 2014.

Vapnik et al., "Learning using privileged information: similarity control and knowledge transfer," Journal of machine learning research, 16(2023-2049):2, 2015.

Veeriah et al., "Discovery of Useful Questions as Auxiliary Tasks", Advances in Neural Information Processing Systems, 9306-9317, Sep. 2019.

Weber et al., "Credit assignment techniques in stochastic computation graphs," International Conference on Artificial Intelligence and Statistics, 2650-2660, 2019.

Zhu et al., "Reinforcement and imitation learning for diverse visuomotor skills," CoRR, abs/1802.09564, 2018.

Office Action in European Appln. No. 20780639.9, dated Jul. 11, 2024, 5 pages.

Office Action in Chinese Appln. No. 202080066633.6, mailed on Jan. 23, 2025, 15 pages (with English translation).

Veeriah et al., "Discovery of Useful Questions as Auxiliary Tasks," Advances in Neural Information Processing Systems 32, 2019, 12 pages.

Zhong et al., "An Intelligent Control System based on Neural Networks and Reinforcement Learning," Journal of Southwest University, Natural Science Edition, Nov. 29, 2013, 35(11):173 (English abstract).

* cited by examiner

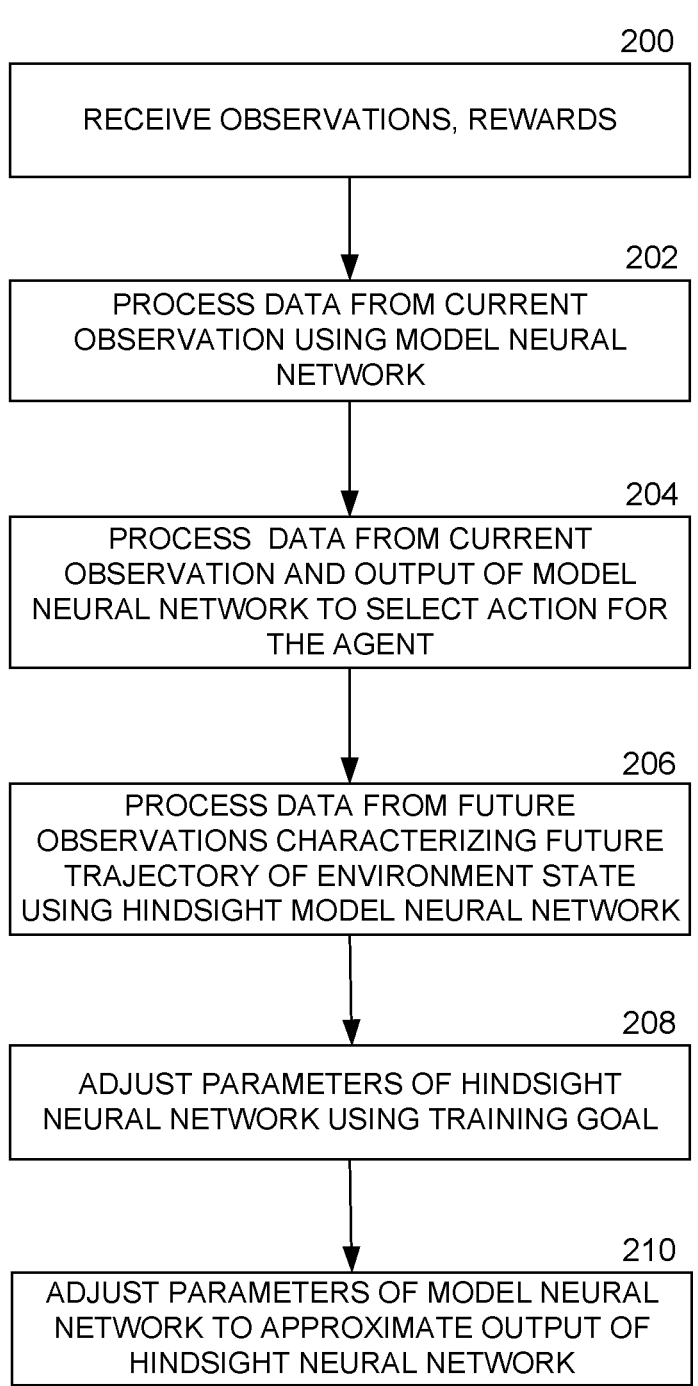

200

RECEIVE OBSERVATIONS, REWARDS

202

PROCESS DATA FROM CURRENT OBSERVATION USING MODEL NEURAL NETWORK

204

PROCESS DATA FROM CURRENT OBSERVATION AND OUTPUT OF MODEL NEURAL NETWORK TO SELECT ACTION FOR THE AGENT

206

PROCESS DATA FROM FUTURE OBSERVATIONS CHARACTERIZING FUTURE TRAJECTORY OF ENVIRONMENT STATE USING HINDSIGHT MODEL NEURAL NETWORK

208

ADJUST PARAMETERS OF HINDSIGHT NEURAL NETWORK USING TRAINING GOAL

210

ADJUST PARAMETERS OF MODEL NEURAL NETWORK TO APPROXIMATE OUTPUT OF HINDSIGHT NEURAL NETWORK

Figure 2

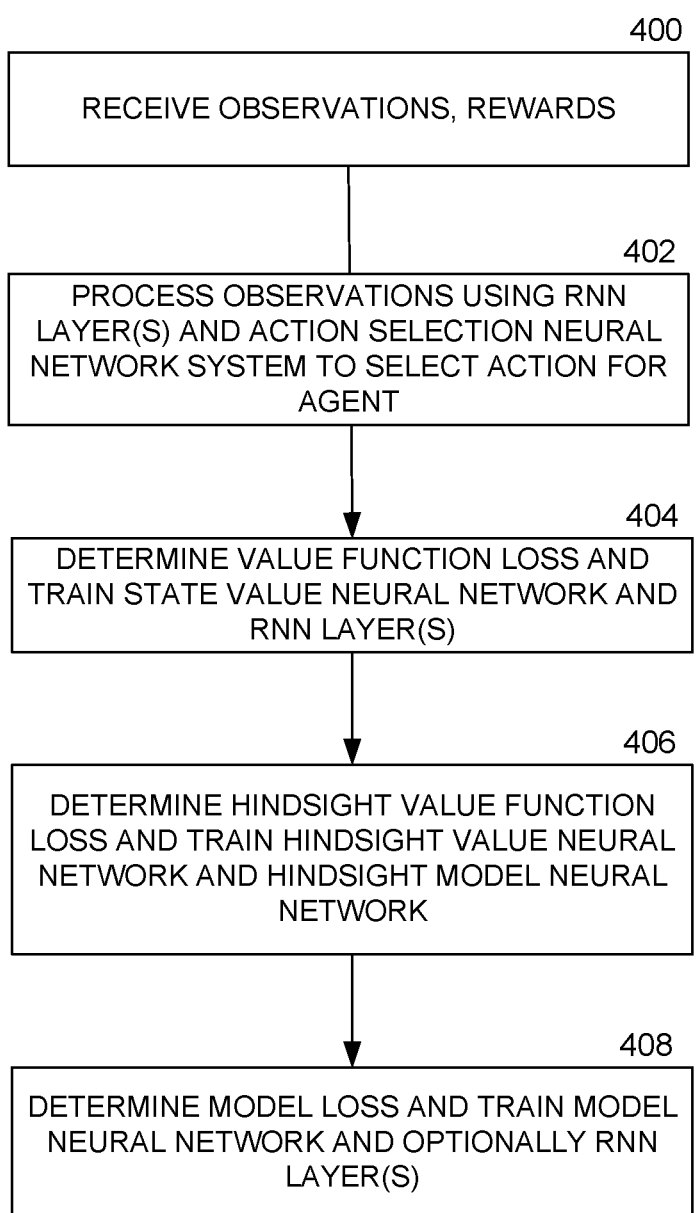

400

RECEIVE OBSERVATIONS, REWARDS

402

PROCESS OBSERVATIONS USING RNN LAYER(S) AND ACTION SELECTION NEURAL NETWORK SYSTEM TO SELECT ACTION FOR AGENT

404

DETERMINE VALUE FUNCTION LOSS AND TRAIN STATE VALUE NEURAL NETWORK AND RNN LAYER(S)

406

DETERMINE HINDSIGHT VALUE FUNCTION LOSS AND TRAIN HINDSIGHT VALUE NEURAL NETWORK AND HINDSIGHT MODEL NEURAL NETWORK

408

DETERMINE MODEL LOSS AND TRAIN MODEL NEURAL NETWORK AND OPTIONALLY RNN LAYER(S)

Figure 4

TRAINING ACTION SELECTION NEURAL NETWORKS USING HINDSIGHT MODELLING

CROSS-REFERENCE TO RELATED APPLICATIONS

This application is a National Stage Application under 35 U.S.C. § 371 and claims the benefit of International Application No. PCT/EP2020/076604, filed Sep. 23, 2020, which claims priority to U.S. Provisional Application No. 62/905, 915, filed Sep. 25, 2019. The disclosures of the foregoing applications are incorporated herein by reference in their entirety.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning method and system that selects actions to be performed by a reinforcement learning agent interacting with an environment. Some implementations of the described methods and systems aim to learn a causal model, using hindsight. This guides the action selection, in particular focusing the model on aspects of the environment which are useful for estimating the value of a current state of the environment. Throughout this specification references to the value of a state may include the value of a state in combination with an action.

In one aspect there is described a method of reinforcement learning. The method may include training an action selection neural network system to select actions to be performed by an agent in an environment for performing a task. The action selection neural network system may be configured to receive data from an observation characterizing a current state of the environment. The action selection neural network system may also be configured to receive data from an output of a model neural network. The action selection neural network system may process the input data in accordance with action selection neural network system parameters to generate an action selection output for selecting the actions to be performed by the agent.

The model neural network may be configured to receive an input (derived) from the observation characterizing the current state of the environment. The output of the model neural network may characterize a predicted state trajectory comprising a series of k predicted future states of the environment starting from the current state.

The method may comprise training a hindsight model neural network having an output characterizing a state trajectory comprising a series of k states of the environment starting from a state of the environment at a time step t. The training may comprise processing data from one or more e.g. a sequence of observations, online or off-line, characterizing the state of the environment at the time step t and at the series of k subsequent time steps, and adjusting parameters of the hindsight model neural network using a training goal for the time step t. The method may further comprise training the output of the model neural network to approximate the output of the hindsight model neural network.

In implementations the hindsight model may be able to learn from a richer stream of information than provided by a reward from the environment which is typically used for model-free training of a reinforcement learning system. For example the hindsight model may be able to learn to represent a trajectory of states which in due course lead to a reward.

More specifically the hindsight model may learn to represent particular aspects of the trajectory of states which are important for receiving a reward. Thus rather than learning to model all the detail in the observations the hindsight model has a low-dimensional feature vector representation output, and optionally a relatively short forward (i.e. hindsight) time window.

These encourage the hindsight model to focus on modelling the particular aspects of the observations which are useful for the training goal e.g. state value or state-action value prediction, thus both speeding up training and reducing the necessary compute. However since this information is only available in hindsight the model neural network is trained to predict this from the current state of the environment using the hindsight model. The hindsight model may process a fixed number of k future states; in implementations k may be less than 50, 20 or 10 e.g. of order 5.

In implementations the hindsight model may therefore be trained to model aspects of the observations which can help to provide better value predictions of states (and state-action pairs), and which are therefore useful in training the action selection neural network. In this way the model may be trained to focus on those aspects of the environment which are most salient for the task to be performed. The model may also be simpler than might otherwise be the case.

In implementations the training goal for the time step t may be any goal which is relevant for the task to be performed.

For example the training goal for the time step t may comprise comprises a state value target for the time step t, or may be derived from one or more state-action value targets for the time step t. For example the training goal for the time step t may define an expected return from the state of the environment at a time step t, e.g. an expected cumulative reward to be received by the agent from the state of the environment at a time step t.

More specifically training the hindsight model may comprise processing, using a hindsight value neural network, the output of the hindsight model neural network and the observation characterizing the state of the environment at the time step t, to generate an estimated hindsight value or state-action value for the state of the environment at the time step t.

The method may then backpropagate gradients of an objective function dependent upon a difference between the estimated hindsight value or state-action value for the state of the environment at the time step t and the training goal for the time step t to update parameters of the hindsight value neural network and the parameters of the hindsight model neural network. Thus a process of learning the hindsight value may be used to train the hindsight model.

In some implementations the training goal (G) for the time step t comprises an actual return for the time step t (e.g. where Monte Carlo learning is used); in other implementations the training goal for the time step t comprises an estimated return for the time step t (e.g. where Temporal Difference, TD, learning is used). Here the return refers to a return refers to a cumulative measure of reward received by the agent, for example, a time-discounted sum of rewards. For example the return for time step t may comprise a combination of an actual return at time step t+1 and an estimated return for subsequent time steps, e.g. the hindsight value for the state of the environment at the time step t+1 reduced by a discount factor $\gamma<1$ (TD(0)); or e.g. an n-step return e.g. TD($\lambda$)) may be used. A difference value used to train the value neural network may comprise a TD error difference value.

Training the output of the model neural network to approximate the output of the hindsight model neural network may comprise backpropagating gradients of an objective function dependent upon a difference between the (vector-valued) outputs i.e. between features of the state trajectory and features the predicted state trajectory. These features may represent aspects of the trajectories which are useful to predict the value of state-action value at a current time step t. The difference may comprise e.g. an L2 norm or a cross-entropy loss. The model neural network and the hindsight model neural network may be trained jointly or separately e.g. sequentially.

In some implementations the method the hindsight model neural network is configured to learn at a slower rate than the action selection neural network system (e.g. by selecting learning rate parameters), to facilitate the output of the model neural network learning to approximate the output of the hindsight model neural network.

In implementations the output of the hindsight model neural network characterizing the state trajectory and the output of the model neural network characterizing the predicted state trajectory each comprise a (multi-dimensional) reduced dimensionality representation of one or more observations of the environment. This can facilitate faster or reduced compute learning of useful representations of the (predicted) state trajectory and may help to encourage representations useful for predicting state value. For example the output of the hindsight model neural network characterizing the state trajectory and the output of the model neural network characterizing the predicted state trajectory may each comprise a feature vector having a dimensionality of less than a dimensionality of their input or less than 20, 10 or 5 (but are not scalar).

Training the model neural network and the hindsight model neural network may be performed online or offline (e.g. off-policy). Where training is performed online a k-state buffer may be provided so that training may provided effectively k-states in the past.

Thus the method may further comprise maintaining a memory that stores data representing trajectories generated as a result of interaction of the agent with the environment, each trajectory comprising data at each of a series of time steps identifying at least an observation characterizing a state of the environment and a series of subsequent observations characterizing subsequent states of the environment for training the hindsight model neural network.

For off-policy training of the action selection neural network system a replay buffer may store tuples, e.g. sequences of tuples, comprising: an observation characterizing a state of the environment, an action performed by the agent in response to the observation, a reward received in response to the agent performing the action, and an observation characterizing a next state of the environment.

In general training the action selection neural network system may comprises backpropagating gradients of an objective function dependent upon a difference between a state value or state-action value for the current state of the environment determined (estimated) using the state value neural network and an estimated return or state-action value for the current state of the environment.

The action selection neural network system may be trained using any reinforcement learning method including, e.g., SARSA, Q-learning, and actor-critic techniques including advantage actor-critic techniques (in which learned estimate of a state value is used as a baseline). An output from the action selection neural network system may directly indicate an action e.g. a continuous action, or may parameterize a distribution from which the action is selected, or may directly put an action score or Q-value or may parameterize a distribution from which an action score or Q-value is selected. The reinforcement learning training method may be deterministic or stochastic; it may be a distributed method e.g. with multiple actors and/or learners.

Thus the techniques described herein may be used with conjunction with reinforcement learning systems including, for example: a policy-based system (e.g. an Advantage Actor Critic (A3C) system, Mnih et al. 2016, or a variant thereof), which directly parameterizes a policy, and optionally a value function; a Q-learning system, such as a Deep Q-learning Network (DQN) system or Double-DQN system, in which the output approximates an action-value function, and optionally a value of a state, for determining an action; a continuous control reinforcement learning system such as DDPG (Lillicrap et al. 2015) or a variant thereof; or a distributed actor-critic or Q-value based reinforcement learning system such as IMPALA (Importance-Weighted Actor-Learner), Espholt et al., arXiv:1802.01561, or Recurrent Replay Distributed DQN (R2D2), Kapturowski et al., ICLR 2019.

In some implementations the action selection neural network system may include a state value neural network, to generate a state value or state-action value (Q-value) for selecting, or learning to select, the actions to be performed by the agent. This system may have parameters in common with the model neural network. In some implementations the action selection neural network system may comprise a policy neural network (or policy head) that generates a policy output defining a probability distribution over possible actions e.g. a respective score for each action of a predetermined set, for selecting the actions; and a value neural network (or value head) that generates an output that represents the value of a state (e.g. an estimated long-term reward received by the agent starting from the state characterized by the input observation).

For example, in some implementations the action selection neural network system may comprise or receive input from one or more recurrent neural network (RNN) layers. These may be shared by both the action selection neural network system and the hindsight value neural network and/or state value neural network. For example an internal state or hidden layer representation of one or more of the RNN layers may be provided as an input to each of the action selection neural network system and the hindsight value neural network and/or state value neural network. The one or more RNN layers may receive data from each observation characterizing the state of the environment. In implementations the RNN layers are not trained using hindsight.

In some implementations the action selection neural network system may implement a Q-learning process in which an action score or Q-value is determined for each of a set of discrete actions. The action score may be output from the action selection neural network system or may be sampled from a distribution parameterized by the action selection neural network system. Then the hindsight value neural network and/or state value neural network may be configured to generate a corresponding set of action scores. The training goal for time step t may be determined from this corresponding set of action scores, e.g. by determining a single scalar value representing the action scores or by determining a respective difference between each action score (or distribution) from the action selection neural network system and a corresponding action score (or distribution) from the hindsight value neural network.

In some implementations the action selection neural network system may implement an actor-critic process in which the action selection neural network system is configured to generate both an action selection policy output and a value estimate output (critic). The value estimate represents an estimate of a return e.g. a time-discounted return that would result, given the current state of the environment, from selecting future actions performed by the agent in accordance with the current values of the action selection network parameters. For example an estimated n-step look-ahead return may be given by:

$$\hat{R}_t = \sum_{i=1}^{n-1} \gamma^i r_{t+i} + \gamma^n V(o_{t+n})$$

where $\gamma$ is a discount factor between 0 and 1, $r_{t+i}$ is the reward received at time step t+i, and $V(o_{t+n})$ refers to the value estimate at time step t+n. The time-discounted return may be used as a training goal for the hindsight value neural network and for the state value neural network.

Where the action selection neural network system implements an actor-critic based approach (or otherwise) the action selection neural network system may provide separate outputs defining state value and action selection (policy). In such a system the observation characterizing a current state of the environment and the output of the model neural network are processed by the action selection neural network system to generate the state value and action selection (policy) outputs. For example the observations may be processed by one or more RNN layers and afterwards combined with the output of the model neural network in one or more subsequent neural network layers to generate an action selection output e.g. comprising an action selection (policy) output (as well as the state value output).

In broad terms, the hindsight value neural network and state value neural network may each be configured to generate either a state value or a vector of state-action values (Q-values), dependent respectively on the output of the hindsight model neural network characterizing the state trajectory and on the output of the model neural network characterizing the predicted state trajectory.

In general observations used in implementations of the system may be pre-processed, e.g. by a convolutional or other neural network.

Once the model neural network is trained the hindsight model neural network may be omitted. That is, the system may be used for performing a task without the hindsight model neural network present.

Thus a method of selecting an action to be performed by an agent in an environment for performing a task may comprise receiving an observation characterizing a current state of the environment. The method may further comprise processing the observation using a model neural network to generate a model neural network output, e.g. a multi-dimensional feature vector, characterizing a predicted state trajectory comprising a series of k predicted future states of the environment starting from the current state. The method may further comprise processing the observation characterizing the current state of the environment and the model neural network output to generate an action selection output for selecting the action to be performed by the agent for performing the task.

Additional features of the method may all be as previously described, but with omission of the hindsight model neural network.

There is also provided a neural network computer system for performing a task, comprising a combination of the (trained) action selection neural network system and the (trained) model neural network.

In another aspect there is provided a reinforcement learning neural network system comprising an action selection neural network system to select actions to be performed by an agent in an environment for performing a task. The action selection neural network system may be configured to receive input data from i) an observation characterizing a current state of the environment and or ii) an output of a model neural network, and to process the input data in accordance with action selection neural network system parameters to generate an action selection output for selecting the actions to be performed by the agent. The system may further comprise a model neural network. The model neural network may be configured to receive an input from the observation characterizing the current state of the environment. The output of the model neural network may characterize a predicted state trajectory comprising a series of k predicted future states of the environment starting from the current state.

The system may be configured to train a hindsight model neural network having an output characterizing a state trajectory comprising a series of k states of the environment starting from a state of the environment at a time step t, by processing observations characterizing the state of the environment at the time step t and at the series of k subsequent time steps and adjusting parameters of the hindsight model neural network using a training goal for the time step t. The system may be further configured to train the output of the model neural network to approximate the output of the hindsight model neural network.

In some implementations, the environment is a real-world environment and the agent is a mechanical agent, such as a robot, vehicle, or other mechanical agent, interacting with the real-world environment. The environment may also be a simulation of the real world environment and the agent may be a simulation of the mechanical agent, in which case the system/method may be trained in the simulated environment and may then be deployed to control the agent in the real world environment.

The subject matter described in this specification can be implemented in particular embodiments so as to realize one or more of the following advantages.

Reinforcement learning methods and systems using these techniques may be able to learn faster and more effectively, using less computing power, than previous techniques. The model neural network is able to learn from a richer set of data, i.e. trajectory observations, via the hindsight model neural network, and may be able to selectively learn features relevant to estimating the value of a state of the environment. This is particularly the case where the model neural network learns a reduced dimensionality representation of the observations. Using a reduced dimensionality model can also simplify the learning process.

In broad terms the hindsight model neural network is able to learn features of future observations which are most useful for current state value predictions, and these are passed on to the model neural network. As a consequence learning is faster and requires less memory and computing power than some other techniques. The described systems and methods may be able to learn to perform tasks which other techniques cannot, or to learn to perform better on tasks than other techniques, especially in complex environments. The described systems and methods are general in that they can be applied to a wide range of reinforcement learning tasks and do not require hand-engineered auxiliary rewards.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

FIG. 2 is a flow diagram of an example process for training the reinforcement learning system of FIG. 1.

FIG. 4 is a flow diagram of an example process for training the reinforcement learning system according to FIGS. 3a-3d.

In the Figures like reference numerals indicate like elements.

DETAILED DESCRIPTION

This specification describes a neural network based reinforcement learning system and method. During training the system/method models those aspects of an environment in which the system operates which, with hindsight knowledge, can be identified as important to achieving a desired outcome as indicated by a reward signal from the environment.

In implementations, rather than simply learning from a scalar return, or attempting to determine a complete model of the environment, the system/method learns to model a small number of features which characterize the return from a future trajectory of states. During training this future trajectory is known because it has already happened—that is the model uses hindsight. However at a particular time when the system/method is controlling an agent to take an action this future information is not available. Thus a second model is trained to approximate the hindsight model, but using only present (and past) information, and this second model is used for selecting actions.

In this specification the model using hindsight is implemented by a hindsight model neural network and the second model is implemented by a model neural network. At a current time step the hindsight model neural network received data from future observations as an additional input and learns features of these observations that are useful for learning a training goal e.g. a state value estimate or a state-action (Q) value estimate. The model neural network learns to predict these features from one or more observations available at the current time step.

Figure 1:
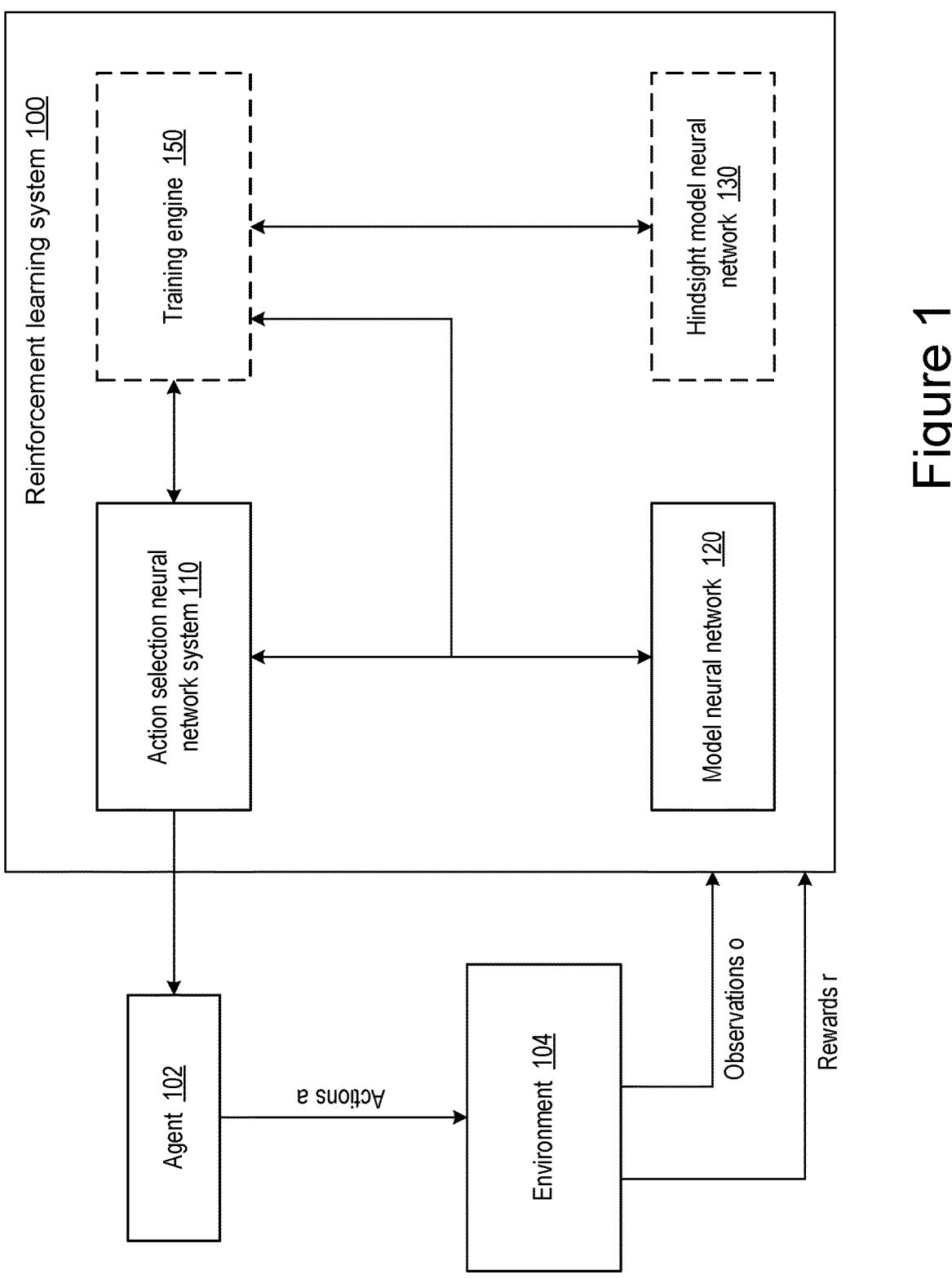
FIG. 1 shows a reinforcement learning system that implements hindsight modelling.

FIG. 1 shows a reinforcement learning system 100 that may be implemented as computer programs on one or more computers in one or more locations. The reinforcement learning system 100, at each of multiple time steps, t, selects actions, at, to be performed by an agent 102 in an environment 104. At each time step the reinforcement learning system 100 receives and processes data characterizing a state of the environment, referred to in this specification as an observation, $o_t$ for selecting an action. The observation may include an image of the environment and/or other sensor or input data from the environment.

The reinforcement learning system 100 may also receive a reward $r_t$ as a result of performing the action at. In general the reward is a numerical value and may be based on any event or aspect of the environment. For example, the reward $r_t$ may indicate whether the agent 106 has accomplished a task (e.g., a manipulation task, or navigating to a target location in the environment) or progress of the agent 106 towards accomplishing a task.

In some implementations, the environment is a real-world environment, or a simulation of a real-world environment. The agent may comprise a mechanical agent interacting with the real-world environment, or a simulation of a such mechanical agent, or a control system for a mechanical agent.

For example, the agent may comprise a control system of an autonomous or semi-autonomous vehicle navigating through the environment. In these implementations, the actions may be possible control inputs to control the vehicle and the result that the agent is attempting to achieve is to satisfy objectives for the navigation of the vehicle through the real-world environment. For example, the objectives can include one or more objectives such as: reaching a destination, ensuring the safety of any occupants of the vehicle, minimizing energy used in reaching the destination, maximizing the comfort of the occupants. As another example, the agent may be a robot or other mechanical agent interacting with the environment to achieve a specific task, e.g., to locate an object of interest in the environment or to pick up or move an object of interest to a specified location in the environment.

In these implementations, the actions may be possible control inputs to control the robot i.e. to control a physical behavior of the robot or vehicle. For example the actions may be control inputs to control the robot, e.g., torques for the joints of the robot or higher-level control commands; or to control the autonomous or semi-autonomous land or air or sea vehicle, e.g., torques to the control surface or other control elements of the vehicle or higher-level control commands; or e.g. motor control data. In other words, the actions can include for example, position, velocity, or force/torque/acceleration data for one or more joints of a robot or parts of another mechanical agent. Action data may include data for these actions and/or electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g. braking and/or acceleration of the vehicle.

In general the observations may include, for example, one or more of images, object position data, and sensor data to capture observations as the agent interacts with the environment, for example sensor data from an image, distance, or position sensor or from an actuator. In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations. For example in the case of a robot the observations may include data characterizing the current state of the robot, e.g., one or more of: joint position, joint velocity, joint force, torque or acceleration, and global or relative pose of a part of the robot such as an arm and/or of an item held by the robot. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

The rewards, that is the external rewards from the environment, may include e.g. one or more rewards for approaching or achieving one or more target locations, one or more target poses, or one or more other target configurations. For example for a robot a reward may depend on a joint orientation (angle) or velocity, an end-effector position, a center-of-mass position, or the positions and/or orientations of groups of body parts. Costs (i.e. negative rewards) may be similarly defined e.g. dependent upon applied force when interacting with an object, energy usage, or positions of robot body parts.

The system/method may be used to train a vehicle or robot to perform a task such as warehouse, logistics, or factory automation task, e.g. collecting, placing, or moving stored goods or goods or parts of goods during their manufacture; or a learned task may comprise a package delivery control task. The actions may include actions relating to steering or other direction control actions, and the observations may include observations of the positions or motions of other vehicles or robots.

A robot or vehicle may be trained in simulation before being used in a real-world environment. As described later, once the system is trained the hindsight model neural network is no longer needed and may be omitted.

In some implementations the real-world environment may be a manufacturing plant or service facility, the observations may relate to operation of the plant or facility, for example to resource usage such as power consumption, and the agent may control actions or operations in the plant/facility, for example to reduce resource usage.

Thus in some applications the agent may be an electronic agent and the observations may include data from one or more sensors monitoring part of a plant or service facility such as current, voltage, power, temperature and other sensors and/or electronic signals representing the functioning of electronic and/or mechanical items of equipment. The agent may control actions in a real-world environment including items of equipment, for example in a facility such as: a data center, server farm, or grid mains power or water distribution system, or actions in a manufacturing plant or service facility, or actions in an electrical power generation facility such as a solar or wind farm. The observations may then relate to operation of the plant or facility, e.g. they may include observations of power or water usage by equipment, or observations of power generation or distribution control, or observations of usage of a resource or of waste production. The actions may include actions controlling or imposing operating conditions on items of equipment of the plant/facility, and/or actions that result in changes to settings in the operation of the plant/facility e.g. to adjust or turn on/off components of the plant/facility. A learned task may be a control task, with corresponding rewards, e.g. resource usage e.g. water or power control; environmental impact control, electrical or other power consumption control; heating, cooling or temperature control, and generally control of items within the facility. A reward may comprise one or more rewards dependent on performance of such a control task.

In some other implementations the real-world environment may be a renewal energy plant, the observations may relate to operation of the plant, for example to maximize present or future planned electrical power generation, and the agent may control actions or operations in the plant to achieve this.

Thus in general terms, in implementations the agent may be a mechanical or electronic agent and the actions may comprise control inputs to control the mechanical or electronic agent. The observations may be derived from sensors, for example image sensors, and/or they may be derived from electrical or mechanical signals from the agent.

In some further implementations, the environment is a real-world environment and the agent is a computer system that generates outputs for presentation to a user. For example, the environment may be a patient diagnosis environment such that each state is a respective patient state of a patient, i.e., as reflected by health data characterizing the health of the patient, and the agent may be a computer system for suggesting treatment for the patient. In this example, the actions in the set of actions are possible medical treatments for the patient and the result to be achieved can include one or more of maintaining a current health of the patient, improving the current health of the patient, minimizing medical expenses for the patient, and so on. The observations may comprise data from one or more sensors, such as image sensors or biomarker sensors, and/or may comprise processed text, for example from a medical record.

As another example, the environment may be a chemical synthesis or protein folding environment such that each state is a respective state of a protein chain or of one or more intermediates or precursor chemicals and the agent is a computer system for determining how to fold the protein chain or synthesize the chemical. In this example, the actions are possible folding actions for folding the protein chain or actions for assembling precursor chemicals/intermediates and the result to be achieved may include, e.g., folding the protein so that the protein is stable and so that it achieves a particular biological function or providing a valid synthetic route for the chemical. As another example, the agent may be a mechanical agent that performs or controls the protein folding actions or chemical synthesis steps selected by the system automatically without human interaction. The observations may comprise direct or indirect observations of a state of the protein or chemical/intermediates/precursors and/or may be derived from simulation.

In some applications the agent may be a static or mobile software agent i.e. a computer programs configured to operate autonomously and/or with other software agents or people to perform a task. For example the environment may be an integrated circuit routing environment and the system may be configured to learn to perform a routing task for routing interconnection lines of an integrated circuit such as an ASIC. The rewards (or costs) may then be dependent on one or more routing metrics such as an interconnect resistance, capacitance, impedance, loss, speed or propagation delay, physical line parameters such as width, thickness or geometry, and design rules. The observations may be observations of component positions and interconnections; the actions may comprise component placing actions e.g. to define a component position or orientation and/or interconnect routing actions e.g. interconnect selection and/or placement actions. The routing task may thus comprise placing components i.e. determining positions and/or orientations of components of the integrated circuit, and/or determining a routing of interconnections between the components. Once the routing task has been completed an integrated circuit, e.g. ASIC, may be fabricated according to the determined placement and/or routing.

In some applications the environment may be a data packet communications network environment, and the agent may comprise a router to route packets of data over the communications network. The actions may comprise data packet routing actions and the observations may comprise e.g. observations of a routing table which includes routing metrics such as a metric of routing path length, bandwidth, load, hop count, path cost, delay, maximum transmission unit (MTU), and reliability. A learned task may include be packet routing task with rewards/costs to maximize or minimize one or more of the routing metrics. In some other applications the agent is a software agent which manages distribution of compute tasks across computing resources e.g. on a mobile device and/or in a data center. In these implementations, the observations may include observations of computing resources such as compute and/or memory capacity, or Internet-accessible resources; and the actions and a related task may include assigning compute tasks to particular computing resources. The rewards may be dependent upon e.g. utilization of computing resources, electrical power, bandwidth, and computation speed.

In some other applications the environment is an Internet or mobile communications environment and the agent is a software agent which manages a personalized recommendation for a user. The observations may comprise (features characterizing) previous actions taken by the user; a task may include actions recommending items such as content items to a user. The rewards may include an estimated likelihood that the user will respond favorably to being recommended the (content) item, or a number of recommendations received by the user (optionally within a time span); a cost may be dependent on the suitability of one or more recommended items, a cost of the recommended item(s). As further example, the actions may include presenting advertisements, the observations may include advertisement impressions or a click-through count or rate, and the reward may characterize previous selections of items or content taken by one or more users.

In some further applications, the environment is a cyber-security environment. For example, the observations may comprise data characterizing a state of a computer network or a distributed computing system, and the actions may define one or more tasks to be performed to defend the computer system against a cybersecurity attack e.g. by one or more other agents. A reward may comprise one or more rewards dependent on a measure of system/environment security e.g. on a number of detected attacks.

In general in the above described applications, where the environment is a simulated version of a real-world environment, once the system/method has been trained in the simulation it may afterwards be applied to the real-world environment (and optionally the hindsight model neural network omitted). That is control signals generated by the system/method may be used to control the agent to perform a task in the real-world environment in response to observations from the real-world environment. Optionally the system/method may continue training in the real-world environment based on one or more rewards from the real-world environment.

In some other implementations, the environment is a simulated environment and the agent is implemented as one or more computer programs interacting with the simulated environment. For example, the simulated environment may be a virtual environment in which a user competes against a computerized agent to accomplish a goal and the agent is the computerized agent. In this example, the actions in the set of actions are possible actions that can be performed by the computerized agent and the result to be achieved may be, e.g., to win the competition against the user. In some implementations, the environment is a simulated environment and the agent is implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

Optionally, in any of the above implementations, the observation at any given time step may include data from a previous time step that may be beneficial in characterizing the environment, e.g., the action performed at the previous time step, the reward received at the previous time step, and so on.

Referring again to FIG. 1, the reinforcement learning system 100 comprises a hindsight model neural network 130 which receives and processes data characterizing a state trajectory comprising a series of k states of the environment starting from a state of the environment at a current time step t, and provides a corresponding feature vector output, $\phi$. The received and processed data is derived from one or a sequence of observations occurring after time t e.g. $o_{t+1}$ ... $o_{t+k}$ representing corresponding states of the environment.

A training engine 150 is configured to adjust parameters of the hindsight model neural network using a training goal of the reinforcement learning system 100. For example the output of the hindsight model neural network may be used to determine an estimate of the training goal, and the parameters of the hindsight model neural network may be adjusted e.g. by backpropagation, to improve the estimate.

The reinforcement learning system 100 also comprises a model neural network 120 which receives an input derived from the observation $o_t$ characterizing the current state of the environment. The training engine 150 is configured to train a feature vector output, $\hat{\phi}$ of the model neural network 120 to approximate the output of the hindsight model neural network e.g. based on a loss function, such as a squared loss or cross-entropy loss, measuring a difference between the two outputs.

Thus the feature vector output of the model neural network 120 is trained to characterize a predicted state trajectory comprising a series of k predicted future states of the environment starting from the current state. Because the hindsight model neural network is trained using the training goal, the feature vector output of the model neural network 120 also learns features useful for estimating this goal.

In implementations the training goal comprises a state value or state-action value of a current state of the environment. This may be a return for the time step t starting from the current state (state value) or starting from the current state with a particular action executed first (state-action value), when following an action-selection policy of the reinforcement learning system 100. In general the return is an estimate of a cumulative reward, e.g. a long-term time-discounted sum of future rewards, that will be received from the environment if the agent interacts with the environment by performing actions selected by the reinforcement learning system.

The reinforcement learning system 100 includes an action selection neural network system 110. This receives both the observations $o_t$ and the feature vector output, $\hat{\phi}$, of the model neural network 120 and uses this information to generate an action selection output for selecting the actions to be performed by the agent.

The action selection neural network system 110 may implement any reinforcement learning technique, for example a Q-learning technique or an actor-critic technique.

For example the action selection output may comprise a vector of Q-values, one for each action in a set of possible actions that can be performed by the agent. Then an action with a maximum Q-value may be selected or the Q-values can be processed, e.g. using a soft-max function, to generate a respective probability value for each possible action, which can be used to select the action to be performed by the agent.

In an actor-critic approach the action selection output may comprise an action selection policy output which includes a respective numerical probability value for each action in a set of possible actions that can be performed by the agent at the time step. Then the action to be performed by the agent may be determined by selecting the action with the highest probability value or by sampling an action in accordance with the probability values for the actions. As another example, the action selection policy output may directly define the action to be performed by the agent, for example, by indexing an action in a set of possible actions that can be performed by the agent or by providing a continuous value output defining a value for a continuous valued action to be taken by the agent. In an actor-critic approach an estimated state value acts as a critic which is used when adjusting parameters of the action selection neural network system during training.

In FIG. 1 the hindsight model neural network 130 is only used during training and thus this, and the other elements shown dashed in FIG. 1, may be omitted from a trained system/method.

FIG. 2 is a flow diagram of an example process for training the reinforcement learning system of FIG. 1. The process receives observations and rewards (step 200) and processes data derived from a current observation using the model neural network 120 (step 202). An output of the model neural network 120 and the is processed by the action selection neural network system 110 in conjunction with data derived from the current observation to select an action to be performed by the agent (step 204).

Data derived from one or more future observations, and characterizing a future trajectory of the state of the environment over k time steps, is processed by the hindsight model neural network 130 (step 206). This may be done, e.g. by delaying processing of the current observation by k time steps. The process then adjusts parameters of the hindsight model neural network 130 using a training goal for the current time step (step 208), and adjusts parameters of the model neural network 120 so that the model neural network 120 provides an output which approximates the output of the hindsight model neural network 130 (step 210).

The process of FIG. 2 is performed repeatedly e.g. until a termination criterion is reached such as training for a number of time steps or obtaining a reward indicating completion of a task, or indefinitely. The steps may be performed in a different order to those indicated. After training steps 206-210 may be omitted.

Figure 3D:
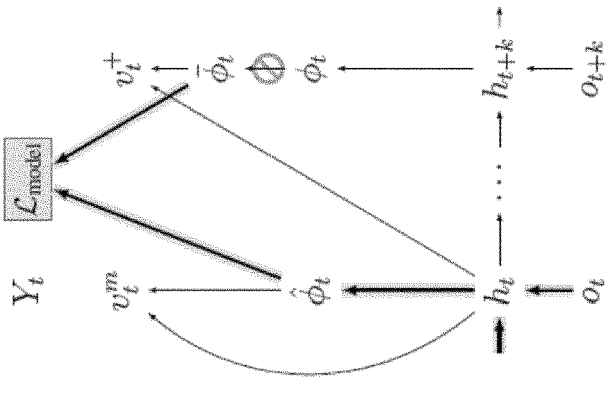
FIGS. 3a-3d illustrate schematically training and operation of an example of the reinforcement learning system of FIG. 1.
Figure 3C:
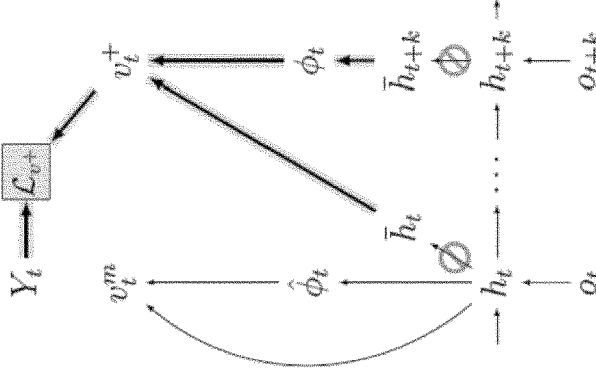
Figure 3B:
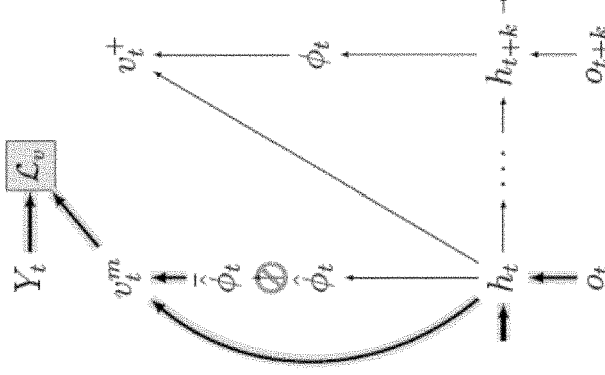
Figure 3A:
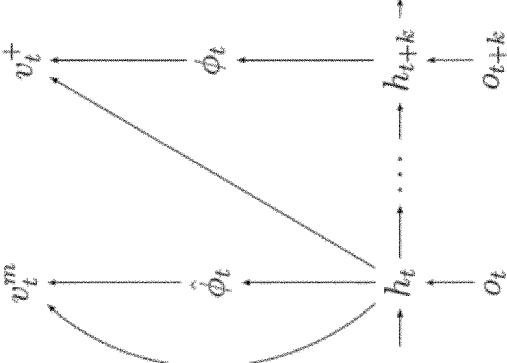

FIGS. 3a-3d illustrate schematically the training and operation of an example of the reinforcement learning system 100 of FIG. 1. FIG. 3a illustrates, schematically, an example architecture for the reinforcement learning system, and FIGS. 3b-3d illustrate training the system. In FIGS. 3a-3d the nodes indicate neural network outputs and the edges indicate learnable transforms, i.e. one or more neural network layers, leading to those outputs. Edges are in bold when learned and a slashed zero denotes that gradients are stopped in backpropagation.

The particular example of FIGS. 3a-3d relates to an actor-critic reinforcement learning system and illustrates predicted state values. The training and operation of a Q-learning system is similar but predicts state-action values.

The action selection neural network system is not explicitly shown in FIGS. 3a-3d. In an actor-critic reinforcement learning system an action selection neural network (not shown) may be included; this may share parameters with the state value neural network described below. In a Q-learning system the vector of Q-values, $$q_t^m,$$

may be used to select actions.

In the particular example of FIGS. 3a-3d the observations $o_t$ are processed by one or more recurrent neural network (RNN) layers such as long short-term memory (LSTM) recurrent. The observations may be pre-processed by one or more convolutional (CNN) layers (not shown). The RNN layer(s) provide a state representation $h_t$, generally referred to as an internal or hidden state representation, based on the current observation and on the previous internal state $h_{t-1}$. This can be useful when (as often) the environment is only partially observable.

In FIGS. 3a-3d $h_t$ and $h_{t+k}$ indicate internal states of the RNN layer(s) at time t and t+k respectively; $\phi_t$ indicates the output of the hindsight model neural network 130 at time t; and $\hat{\phi}_t$ indicates the output of the model neural network 120 at time t. The hindsight model neural network 130 processes an input $h_{t+k}$ to determine $\phi_t$, and the model neural network 120 processes an input $h_t$ to determine $\hat{\phi}_t$.

During training the system uses a hindsight value neural network to implement a hindsight value function to determine an estimated hindsight value, $$v_t^+,$$

15                                                      16 for the state of the environment at the time step t. The hindsight value neural network, indicated by edges in FIGS. 3a-3d, is denoted $\psi_{\theta_1}$, (not labelled in the Figure) and has neural network parameters $\theta_1$. The hindsight value neural network processes a combination of the feature vector output of the hindsight model neural network, $\phi_t$, and data from the observation $o_t$, in FIGS. 3a-3d $h_t$, to determine $$v_t^+.$$

If the hindsight model neural network has parameters $\theta_2$ then $$v_t^+$$

may be given by:

$$v_t^+ = \psi_{\theta_1}\left(h_t, \phi_{\theta_2}(\tau_t^+)\right)$$

where $$\tau_t^+$$

may comprise any of the future observations, actions and rewards in the trajectory following time t, e.g. the k observations following time t.

The system also has a state value neural network to determine a model-based value estimate, $v^m$, for the state of the environment at the time step t. The state value neural network, indicated by edges in FIGS. 3a-3d, is denoted $\psi_{\eta_1}$ (not labelled in the Figures) and has neural network parameters $\eta_1$. In implementations the value estimate, $$v_t^m,$$

is used for training the action selection neural network system (as well as the action selection neural network system having an input $\hat{\phi}^r$). The state value neural network processes a combination of the feature vector output of the model neural network, $\hat{\phi}_t$, and data from the observation $o_t$, in FIGS. 3a-3d $h_t$, to determine $$v_t^m.$$

If the model neural network has parameters $\eta_2$ then $$v_t^m$$

may be given by:

$$v_t^m = \psi_{\eta_1}\left(h_t, \hat{\phi}_{\eta_2}(h_t)\right)$$

In a system which uses Q-learning $\psi_{\theta_1}$ and $\psi_{\eta_1}$, may generate respective vectors of state-action values i.e. Q-values $$q_t^+$$

and $$q_t^m,$$

instead of scalar state values $$v_t^+$$

and $$v_t^m.$$

Alternatively $\psi_{\theta_1}$ and $\psi_{\eta_1}$ may generate outputs which parameterize distributions of Q-values from which values of $$q_t^+$$

and $$q_t^m$$

are selected stochastically.

Whilst it can be seen from the above equations that there is no additional information in $\hat{\phi}_{\eta_2}(h_t)$ than in $h_t$, nonetheless $\hat{\phi}_{\eta_2}(h_t)$ can still provide a better training signal because it can benefit from having been trained on a richer signal in hindsight. Moreover the use of the model, and hindsight model, can force information about the future trajectory through a bottleneck representation of the future trajectory, so that the learned feature vectors identify those feature of the future/predicted future which are maximally useful in predicting the return from a trajectory at time t.

In implementations, therefore, the learned feature vector outputs from the hindsight model neural network and model neural network have a lower dimensionality than their input e.g. less than 20. This can facilitate learning. Similarly it can be useful to have a limited view of future observations i.e. the number of steps, k, the system looks ahead may be limited e.g. to less than 20 steps e.g. to around 5 time steps. However it appears that the system is not particularly sensitive to the precise values of these hyperparameters.

FIG. 3b highlights a subset of the reinforcement learning system 100 which is used for training a value function loss $\mathcal{L}_v$. The value function loss $\mathcal{L}_v$ may be any measure of a difference, e.g. a squared difference (mean squared error), between the value estimate, $$v_t^m$$

and the reinforcement learning training goal. The training goal may be a state value determined from a return for the time step t. For example in an IMPALA-based reinforcement learning system (ibid) the training goal may be a V-trace target.

In a Q-learning reinforcement learning system the value function loss $\mathcal{L}_v$, may be any measure of a difference, e.g. a squared difference, between the state-action value estimate for a particular action, $$q_t^m,$$

and the reinforcement learning training goal may be a state-action value for the particular action determined from a return for the time step t. The particular action may be an action (or one of a trajectory of actions) sampled from a memory storing a sequence of experience tuples, each corresponding to a respective time step. An experience tuple corresponding to a time step t may include the observation $o_t$, the action $a_t$ selected to be performed by the agent at the time step, the reward $r_t$ received subsequent to the agent performing the selected action, and a subsequent observation $o_{t+1}$ ($o_{t+1}$ may be omitted when storing sequences of tuples e.g. as in R2D2, ibid). For example in an R2D2-based reinforcement learning system (ibid) the training goal may be the n-step return Q-target defined in the Kapturowski et al. paper.

As shown in FIG. 3b, when training the reinforcement learning system 100 using the value function loss $\mathcal{L}_v$ the training engine 150 backpropagates gradients of the loss to update the neural network parameters 7i7 of the state value neural network ($\psi_{\eta_1}$) and also to the update the neural network parameters of the one or more RNN layers (generating $h_t$), and of one or more CNN layers where present. The parameters $\eta_2$ of the model neural network are not trained using the value function loss $\mathcal{L}_v$ so that, so far as the state value neural network is concerned, $\hat{\phi}_t$, is just an additional input. Denoting with bar notation quantities treated as non-differentiable, i.e. where the gradient is stopped, this may be summarized as $$v_t^m = \psi_{\eta_1}\left(h_t, \overline{\hat{\phi}_{\eta_2}(h_t)}\right)$$

FIG. 3c highlights a subset of the reinforcement learning system 100 which is used for training a hindsight value function loss $\mathcal{L}_{v^+}$. The hindsight value function loss $\mathcal{L}_{v^+}$ may be any measure of a difference, e.g. a squared difference, between the estimated hindsight value, $$v_t^+$$

and the reinforcement learning training goal. That is, the same reinforcement learning training goal is used for the value function loss $\mathcal{L}_v$ and for the hindsight value function loss $\mathcal{L}_{v^+}$. Thus the estimated hindsight value, $$v_t^+$$

and the value estimate, $$v_t^m$$

aim to estimate the same training goal, but using hindsight for the estimated hindsight value, $$v_t^+.$$

As shown in FIG. 3c, when training the reinforcement learning system 100 using the hindsight value function loss $\mathcal{L}_{v^+}$ the training engine 150 backpropagates gradients of the loss to update the neural network parameters $\theta_1$ of the hindsight value neural network ($\psi_{\theta_1}$) and also to the update the neural network parameters $\theta_2$ of the hindsight model neural network ($\phi_{\theta_2}$). In implementations the parameters of the RNN layer(s) are not trained using the hindsight value function loss $\mathcal{L}_{v^+}$.

Thus the hindsight model neural network learns to use the observations, more particularly data derived from a trajectory of the future observations from current time step t as represented by the RNN internal state $h_{t+k}$, to model features of the observations which are useful for estimating the training goal, i.e. for predicting state value (or state-action value), using hindsight. Again with bar notation, this may be summarized as $$v_t^+ = \psi_{\theta_1}\left(\overline{h_t}, \phi_{\theta_2}(\overline{h_{t+k}})\right)$$

FIG. 3d highlights a subset of the reinforcement learning system 100 which is used for training a model loss $\mathcal{L}_{model}$. The model loss $\mathcal{L}_{model}$ may be any measure of a difference between the feature vector output of the hindsight model neural network 130 and the feature vector output of the model neural network 120, i.e. between $\phi_t$ and $\hat{\phi}_t$. For example this may comprise a squared difference between components of $\phi_t$ and $\hat{\phi}_t$ (omitting the t-dependence for clarity), $$\mathcal{L}_{model} = \left\|\phi_{\theta_2}(\tau_t^+) - \hat{\phi}_{\eta_2}(h_t)\right\|_2^2$$

As another example a cross-entropy loss may be used, in which case the feature vector outputs $\phi_t$ and $\hat{\phi}_t$ i.e. between $$\phi_{\theta_2}(\tau_t^+)$$

and $\hat{\phi}_{\eta_2}(h_t)$ may be considered as vectors of logits. A softmax may be applied to each to convert them to probability distributions $$p(\phi_{\theta_2}(\tau_t^+))$$

and $\hat{p}(\hat{\phi}_{\eta_2}(h_t))$ for determining the cross-entropy loss $\mathcal{L}_{model} = H(p,\hat{p})$, where $H(p,\hat{p})$ is the cross-entropy of $\hat{p}$ relative to p.

As shown in FIG. 3d, when training the reinforcement learning system 100 using the model loss $\mathcal{L}_{model}$ the training engine 150 backpropagates gradients of the loss to update the parameters $\eta_2$ of the model neural network ($\phi_{\eta_2}(h_t)$). Optionally gradients may also be backpropagated into the RNN layer(s), and where present CNN layer(s), to train the observation encoding input to the model neural network. Thus the model neural network 120 learns to predict the feature vectors output by the hindsight model neural network 130 using the current observation.

A combined loss, $\mathcal{L}$, for the reinforcement learning system 100 may be expressed as $$\mathcal{L} = \mathcal{L}_v + \alpha\mathcal{L}_{v^+} + \beta\mathcal{L}_{model}$$

where $\alpha$ and $\beta$ are weights with e.g. $\alpha < \beta$ to update $$v_t^+$$

at a reduced rate to allow time for the model $\hat{\phi}_t$ to adapt to the changing hindsight model $\phi_t$.

Where the action selection neural network system 110 has an action selection policy output as previously described, e.g. in an actor-critic reinforcement learning system, the combined loss, $\mathcal{L}$, may include an actor loss to update parameters of an action selection neural network providing the action selection policy output. For example the actor loss may be dependent upon a product of the state value function and a gradient of log $\pi$, with respect to parameters of the action selection neural network, where w is the action selection policy output. Optionally an entropy loss may also be included (negative to reduce a cost of high entropy), e.g. dependent on a sum of $-\pi \cdot \log \pi$ over available actions or some variant of this, to encourage exploration and reduce the risk of premature convergence during training.

FIG. 4 is a flow diagram of an example process for training the example reinforcement learning system 100 according to FIGS. 3a-3d. The steps of FIG. 4 correspond to those shown in FIGS. 3b-3d and may be performed in any order; optionally one or more steps may be repeated before another step is performed. The steps are repeated indefinitely or until a termination criterion is reached, e.g.

Thus the reinforcement learning system 100 receives observations and rewards (step 400) and processes the observations using the CNN layer(s), where present, the RNN layer(s) and the action selection neural network system 110 to select an action to be performed by the agent (step 402). The reinforcement learning system 100 then determines a value function (or state-value function) loss as described above and uses this to train the state value network and RNN layer(s), and CNN layers (step 404). The reinforcement learning system 100 also determines a hindsight value function (or state-value function) loss as described above and uses this to train the hindsight value neural network and the hindsight model neural network (step 406). The reinforcement learning system 100 also determines a model loss as described above and uses this to train the model neural network and optionally the RNN layer(s) and CNN layer(s). Training may be performed offline (e.g. using stored experience tuples), or online by delaying computing of the hindsight value function (or state-value function) loss and model loss by k time steps.

In general the reinforcement learning system 100 can be implemented by any appropriate neural network architectures, for example, neural network architectures which include one or more of convolutional layers, fully-connected layers, and recurrent layers.

Figure 5B:
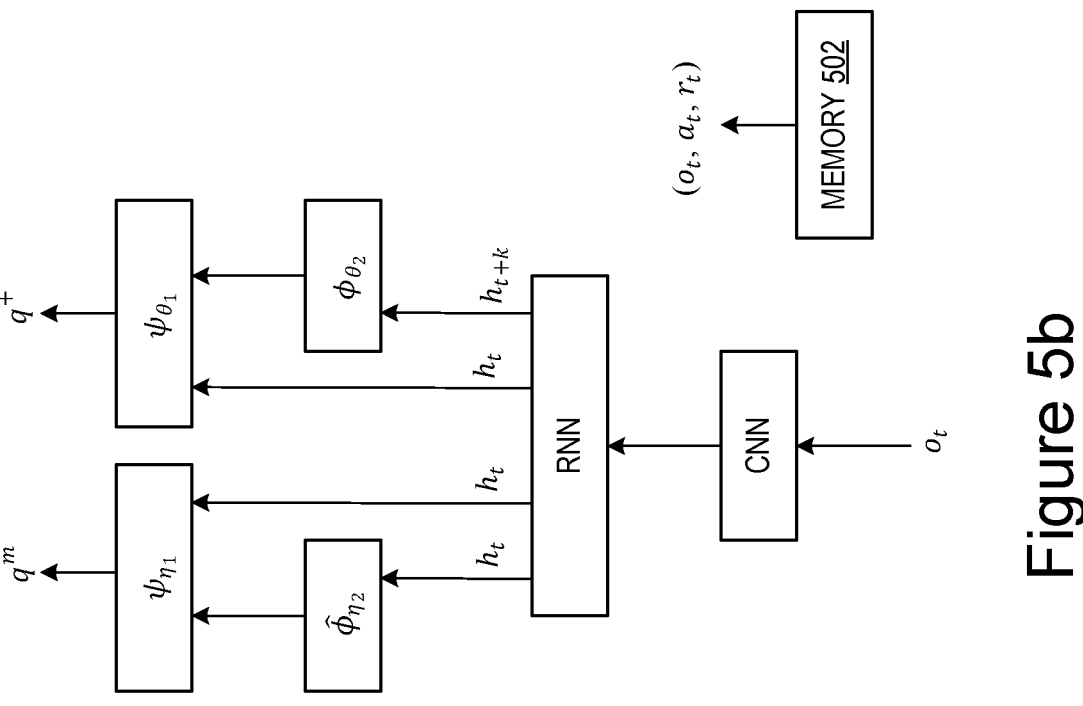
FIGS. 5a and 5b illustrate example neural network architectures of the reinforcement learning system of FIG. 1 for an actor-critic reinforcement learning system and for a Q-learning reinforcement learning system respectively.
Figure 5A:
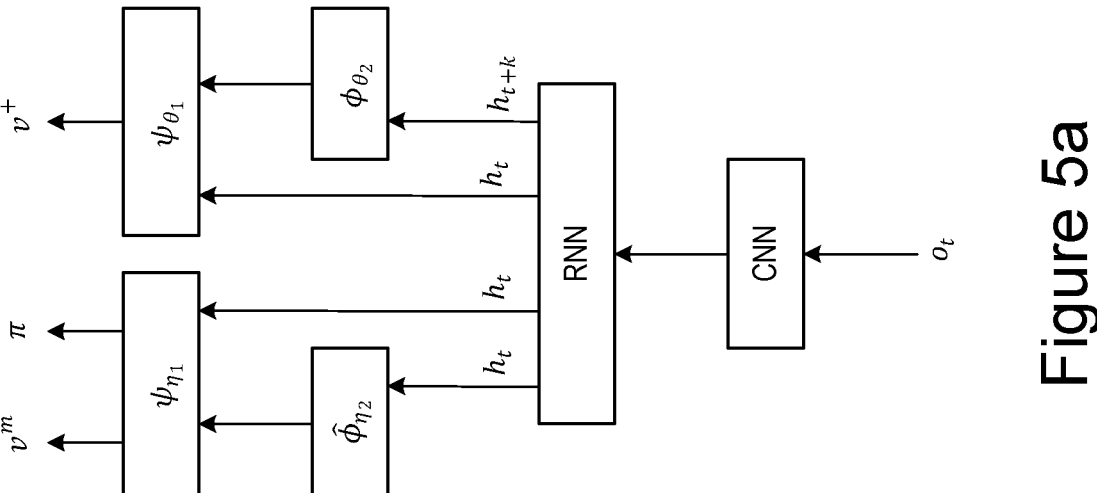

FIGS. 5a and 5b illustrate example neural network architectures for an actor-critic reinforcement learning system 100 (e.g. IMPALA, ibid) and for a Q-learning reinforcement learning system 100 (e.g. R2D2 ibid) respectively, with neural networks denoted by the previously used symbols. In practice the neural networks may share some parameters. The Q-learning reinforcement learning system includes a memory 502 storing sequences of experience tuples, for training.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer implemented method of reinforcement learning, comprising:

training an action selection neural network system to select actions to be performed by an agent in an environment for performing a task, wherein the action selection neural network system is configured to receive input data from i) an observation characterizing a current state of the environment and ii) an output of a model neural network, and to process the input data in accordance with action selection neural network system parameters to generate an action selection output for selecting the actions to be performed by the agent; and wherein the model neural network is configured to receive an input derived from the observation characterizing the current state of the environment and the output of the model neural network characterizes a predicted state trajectory comprising a series of k predicted future states of the environment starting from the current state;

wherein the method further comprises: training a hindsight model neural network having an output characterizing a state trajectory comprising a series of k states of the environment starting from a state of the environment at a time step t, by processing data from one or more observations characterizing the state of the environment at the time step t and at a series of k subsequent time steps the training the hindsight model comprising:

processing, using a hindsight value neural network, the output of the hindsight model neural network and data from the observation characterizing the state of the environment at the time step t, to generate an estimated hindsight value or state-action value for the state of the environment at the time step t, and backpropagating gradients of an objective function dependent upon a difference between the estimated hindsight value or state-action value for the state of the environment at the time step t and a training goal for the time step t to update parameters of the hindsight value neural network and the parameters of the hindsight model neural network; and training the model neural network to generate an output that approximates the output of the hindsight model neural network generated from the observation characterizing the current state of the environment and the one or more observations characterizing the state of the environment at the series of k subsequent time steps after the time step t.

2. The method of claim 1 wherein the action selection neural network system includes a state value neural network for selecting, or learning to select, the actions to be performed by the agent.

3. The method of claim 2 wherein training the action selection neural network system comprises backpropagating gradients of an objective function dependent upon a difference between a state value or state-action value for the current state of the environment determined using the state value neural network and an estimated return or state-action value for the current state of the environment.

4. The method of claim 2 wherein the action selection neural network system has parameters in common with the model neural network.

5. The method of claim 1 further comprising providing, as an input to the action selection neural network system and to the hindsight value neural network, an internal state of one or more recurrent neural network (RNN) layers which receive data from the observations characterizing the state of the environment.

6. The method of claim 1 further comprising providing, as an input to the hindsight model neural network and to the model neural network, an internal state of one or more recurrent neural network (RNN) layers which receive data from the observations characterizing the state of the environment.

7. The method of claim 1 wherein the training goal for the time step t comprises a state value or state-action value target for the time step t.

8. The method of claim 1 wherein the training goal for the time step t comprises an estimated return for the time step t.

9. The method of claim 1 wherein training the output of the model neural network to approximate the output of the hindsight model neural network comprises backpropagating gradients of an objective function dependent upon a difference between the output of the hindsight model neural network characterizing the state trajectory and the output of the model neural network characterizing the predicted state trajectory.

10. The method of claim 1 wherein the output of the hindsight model neural network characterizing the state trajectory and the output of the model neural network characterizing the predicted state trajectory each comprise features of a reduced dimensionality representation of one or more observations of the environment.

11. The method of claim 1 wherein the output of the hindsight model neural network characterizing the state trajectory and the output of the model neural network characterizing the predicted state trajectory each have a dimensionality of less than their input, less than 20, or less than 10.

12. The method of claim 1 wherein k is less than 20.

13. The method of claim 1 further comprising maintaining a memory that stores data representing trajectories generated as a result of interaction of the agent with the environment, each trajectory comprising data at each of a series of time steps identifying at least an observation characterizing a state of the environment and a series of subsequent observations characterizing subsequent states of the environment for training the hindsight model neural network.

14. A reinforcement learning neural network system, comprising: an action selection neural network system to select actions to be performed by an agent in an environment for performing a task, wherein the action selection neural network system is configured to receive input data from i) an observation characterizing a current state of the environment and ii) an output of a model neural network, and to process the input data in accordance with action selection neural network system parameters to generate an action selection output for selecting the actions to be performed by the agent; and the model neural network, wherein the model neural network is configured to receive an input from the observation characterizing the current state of the environment and the output of the model neural network characterizes a predicted state trajectory comprising a series of k predicted future states of the environment starting from the current state; wherein the system is configured to:

train a hindsight model neural network having an output characterizing a state trajectory comprising a series of k states of the environment starting from a state of the environment at a time step t, by processing observations characterizing the state of the environment at the time step t and at a series of k subsequent time steps training the hindsight model comprising:

processing, using a hindsight value neural network, the output of the hindsight model neural network and data from the observation characterizing the state of the environment at the time step t, to generate an estimated hindsight value or state-action value for the state of the environment at the time step t, and backpropagating gradients of an objective function dependent upon a difference between the estimated hindsight value or state-action value for the state of the environment at the time step t and a training goal for the time step t to update parameters of the hindsight value neural network and the parameters of the hindsight model neural network; and train the model neural network to generate, an output that approximates the output of the hindsight model neural network generated from the observation characterizing the current state of the environment and the one or more observations characterizing the state of the environment at the series of k subsequent time steps after the time step t.

15. A neural network computer system for performing a task, comprising: an action selection neural network system to select actions to be performed by an agent in an environment for performing a task, wherein the action selection neural network system is configured to receive input data from i) an observation characterizing a current state of the environment and ii) an output of a model neural network, and to process the input data in accordance with action selection neural network system parameters to generate an action selection output for selecting the actions to be performed by the agent; and a model neural network, wherein the model neural network is configured to receive an input from the observation characterizing the current state of the environment and the output of the model neural network characterizes a predicted state trajectory comprising a series of k predicted future states of the environment starting from the current state, wherein the model neural network has been trained to generate, an output that approximates an output of a hindsight model neural network that the hindsight model neural network would have generated from the observation characterizing the current state of the environment and one or more observations characterizing the state of the environment at the series of k subsequent time steps after a time step t, wherein the hindsight model neural network has been trained by processing the one or more observations characterizing the state of the environment at the time step t and at a series of k subsequent time steps, the training the hindsight model comprising:

processing, using a hindsight value neural network, the output of the hindsight model neural network and data from the observation characterizing the state of the environment at the time step t, to generate an estimated hindsight value or state-action value for the state of the environment at the time step t, and backpropagating gradients of an objective function dependent upon a difference between the estimated hindsight value or state-action value for the state of the environment at the time step t and a training goal for the time step t to update parameters of the hindsight value neural network and the parameters of the hindsight model neural network.

16. The system of claim 14 wherein the action selection neural network system includes a state value neural network for selecting, or learning to select, the actions to be performed by the agent.

17. The system of claim 16 wherein training the action selection neural network system comprises backpropagating gradients of an objective function dependent upon a difference between a state value or state-action value for the current state of the environment determined using the state value neural network and an estimated return or state-action value for the current state of the environment.

18. The system of claim 16 wherein the action selection neural network system has parameters in common with the model neural network.

19. The system of claim 14 further comprising providing, as an input to the action selection neural network system and to the hindsight value neural network, an internal state of one or more recurrent neural network (RNN) layers which receive data from the observations characterizing the state of the environment.

20. The system of claim 14 further comprising providing, as an input to the hindsight model neural network and to the model neural network, an internal state of one or more recurrent neural network (RNN) layers which receive data from the observations characterizing the state of the environment.

* * * * *